United States Patent [19]
Cornelius

[11] 3,978,882
[45] Sept. 7, 1976

[54] MOVER UNIT FOR IRRIGATION LINE

[75] Inventor: Gail Cornelius, Portland, Oreg.

[73] Assignee: R. M. Wade & Co., Portland, Oreg.

[22] Filed: Oct. 16, 1975

[21] Appl. No.: 622,879

[52] U.S. Cl. ............................. 137/344; 239/212; 74/730; 74/421 A; 180/75
[51] Int. Cl.² ........................................... B05B 9/02
[58] Field of Search ...................... 137/344; 280/3; 180/14 R, 75, 66 R; 74/413, 421 R, 421 A, 730

[56] References Cited
UNITED STATES PATENTS 3,800,820  4/1974  Trunnell ............................ 137/344

*Primary Examiner*—Henry T. Klinksiek
*Attorney, Agent, or Firm*—Phillips, Moore, Weissenberger, Lempio & Strabala

[57] ABSTRACT

A wheeled mover unit has mounted to the frame thereof a ring gear, and a rollingly movable irrigation line has fixed thereto oppositely extending arms, to which are mounted hydraulic motors for driving pinion gears in engagement with the ring gear. Conduit means run from a hydraulic pump at the end of the irrigation line to the hydraulic motors to drive the pinion gears so that such pinion gears orbit about the ring gear, turning the oppositely extending arms to in turn rotate the irrigation line.

11 Claims, 6 Drawing Figures

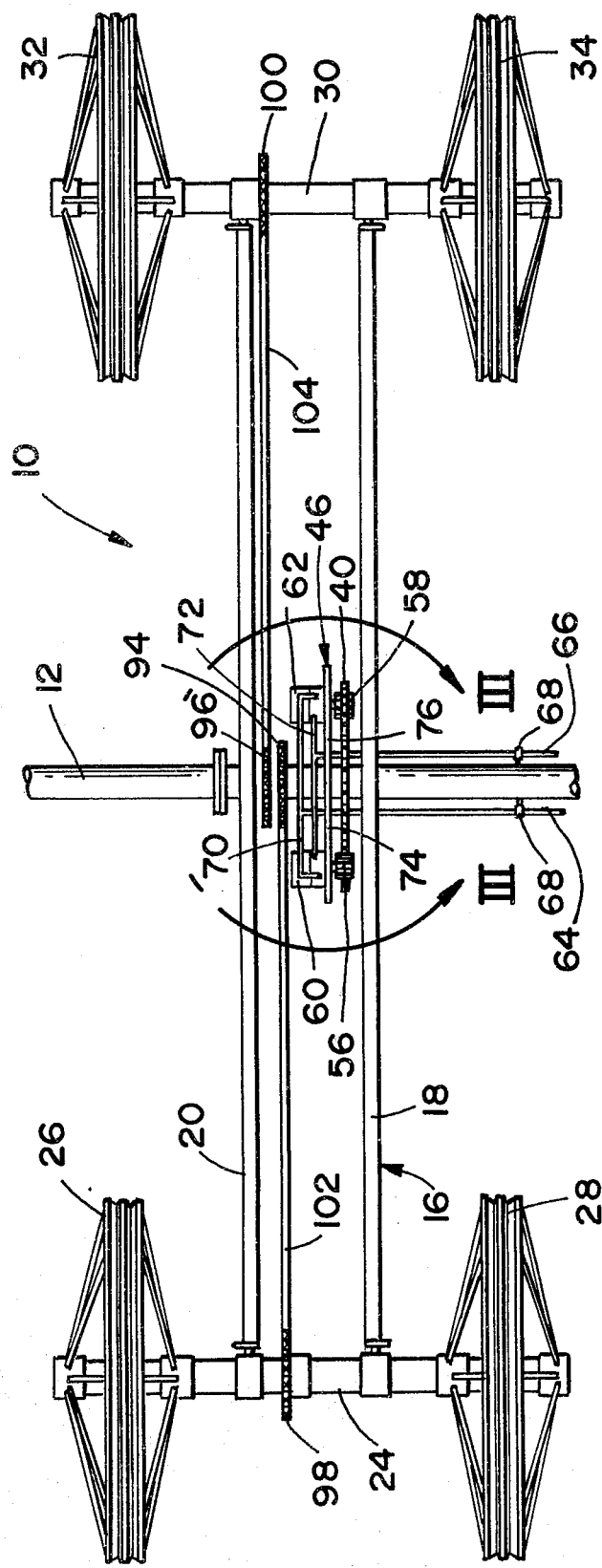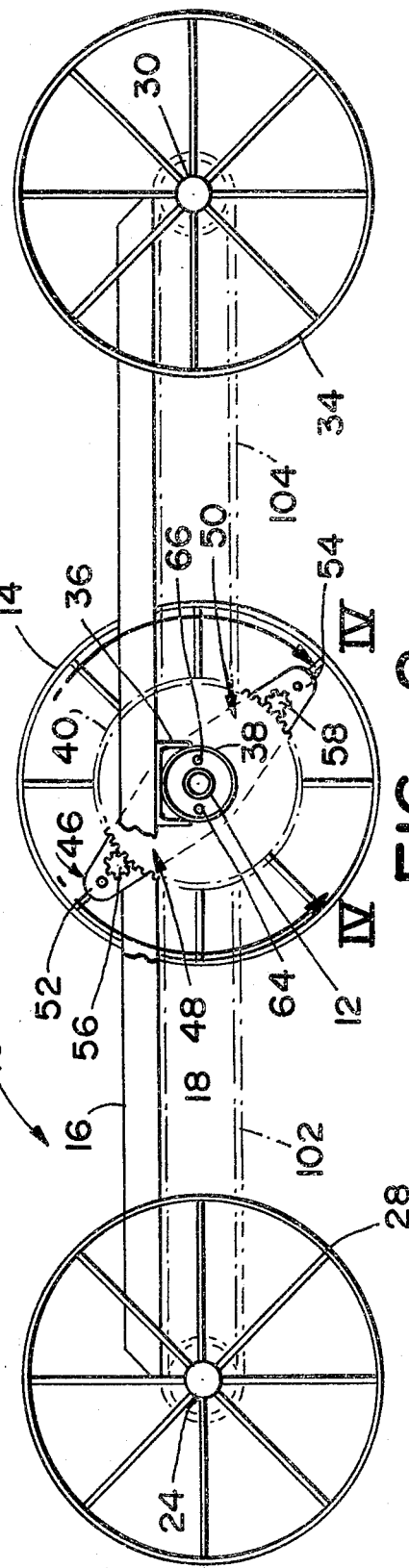

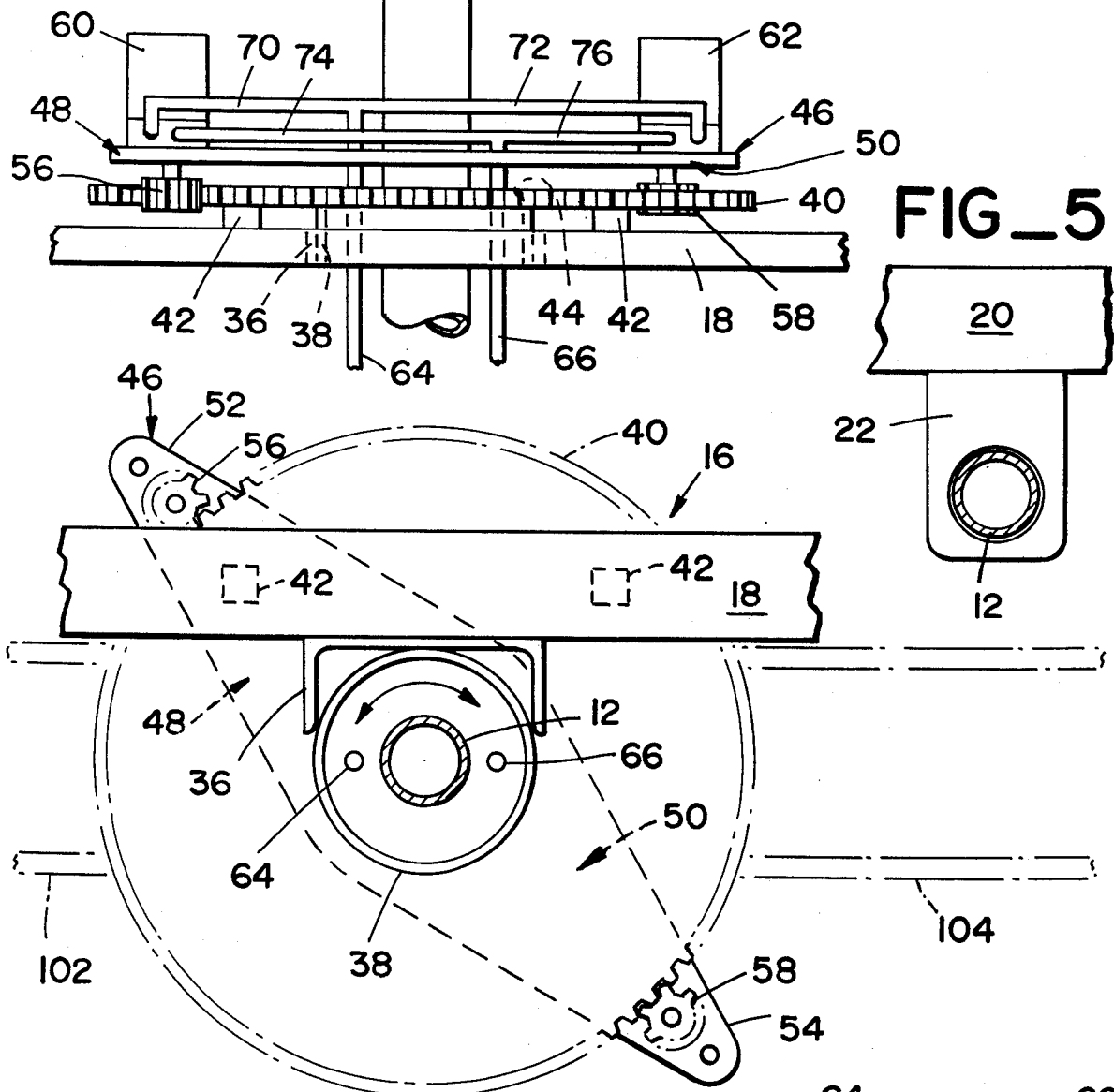

MOVER UNIT FOR IRRIGATION LINE

BACKGROUND OF THE INVENTION

In the movement of an elongated irrigation pipe, it is known to provide a mover unit along the length of the pipe for supporting and moving that portion of the pipe over the ground. Such a mover unit generally includes an engine, a transmission connected thereto, and chain and sprocket means which interconnect the transmission and wheels of the unit, for transmitting motion from the transmission to the wheels.

While such a mover unit has been found relatively efficient in operation, it will be understood that improvements in such a unit are constantly being sought. For example, providing a power source at the end of an irrigation line which is capable of driving a mover unit adjacent the middle of the line could under certain applications be extremely advantageous, since the controls for such a power source would not need to be placed remotely from the power source, but could be connected thereto at the end of the line for convenient manipulation by the operator of the system.

SUMMARY OF THE INVENTION

It is accordingly an object of this invention to provide a drive unit for transporting a portion of an irrigation line which utilizes a power source adjacent an end of the line capable of driving such a mover unit positioned near the middle of the line.

It is a further object of this invention to provide a drive unit which, while fulfilling the above object, is of high efficiency in operation, meanwhile being extremely simple in design.

Broadly stated, the invention comprises an apparatus for rotating a wheel-supported irrigation line about its longitudinal axis for travel thereof over a field comprising a frame to which the irrigation line is rotatably mounted. Further included are means for supporting the frame, and ring gear means fixed relative to the frame. Arm means are fixed relative to the irrigation line and are rotatable therewith. Pinion gear means are rotatably mounted relative to the arm means and in engagement with the ring gear means. Further included are means for driving the pinion gear means so that the pinion gear means move on and about the ring gear means to rotate the arm means and irrigation line.

BRIEF DESCRIPTION OF THE DRAWINGS

These and other objects of the invention will become apparent from a study of the following specification and drawings, in which;

FIG. 1 is a plan view of the drive unit;
FIG. 2 is a side elevation of the drive unit of FIG. 1;
FIG. 3 is an enlarged view of the area III—III of FIG. 1;
FIG. 4 is an enlarged view of the area IV—IV of FIG. 2;
FIG. 5 is a sectional view taken along the line V—V of FIG. 1;
FIG. 6 is a plan view of an end coupler associated with the apparatus.

DESCRIPTION OF THE PREFERRED EMBODIMENT

Shown in FIGS. 1 and 2 is the preferred embodiment of mover 10 associated with an irrigation line 12. The irrigation line 12 is of the well known type, supported by a plurality of wheels 14 fixed thereto along its length, so that the irrigation line 12 may be rotated about its longitudinal axis for travel over a field to be irrigated. The irrigation line 12 includes a plurality of sprinkler units along its length (not shown) as is well known, and water is supplied through the irrigation line 12 to exit therefrom through the sprinkler units to irrigate the field.

The mover 10 includes a frame 16 made up of a pair of spaced frame rails 18,20. The rail 20 has a bracket 22 depending therefrom (see FIG. 5), and the irrigation line 12 is disposed through an aperture in the bracket 22 so that the irrigation line 12 is rotatably mounted to the frame 16. An axle 24 is rotatably mounted relative to the rails 18,20 transversely thereof adjacent one end thereof, and wheels 26,28 are fixed to the opposite ends of the axle 24. Likewise, an axle 30 is rotatably mounted relative to the rails 18,20 at the opposite ends thereof and mounted transversely thereof, and wheels 32,34 are fixed to the ends of the axle 30. The wheels 26,28,32,34 support the frame 16 on the field to be irrigated.

Referring particularly to FIGS. 3 and 4, a downwardly extending bracket 36 is fixed to the bottom portion of rail 18 near the middle thereof, and has in turn fixed thereto a short tubular member 38. The irrigation line 12 passes through such tubular member 38. A ring gear 40 is fixed relative to the frame 16 by being fixed to the inner end of the tubular member 38. Spacer members 42 are also included, fixedly secured to the rail 18 and the ring gear 40, so that the ring gear 40 is properly supported relative to the frame 16. An aperture 44 is provided in the center of the ring gear 40, through which the irrigation line 12 is disposed.

Arm means 46 are fixed relative to the irrigation line 12, to be rotatable therewith, such arm means 46 being made up of first and second arms 48,50 extending in opposite directions from the irrigation line 12. The ends 52,54 of the arms 48,50 extend beyond the outer periphery of the ring gear 40. The extending end 52 of the arm 48 has rotatably mounted thereto a pinion gear 56 in engagement with the ring gear 40, and the extending end 54 of the arm 50 has rotatably mounted thereto a pinion gear 56 in engagement with the ring gear 40, and the extending end 54 of the arm 50 has rotatably mounted thereto a pinion gear 58, also in engagement with the ring gear 40, with the pinion gears 56,58 being in engagement with the ring gear 40 on opposite sides of the ring gear 40 along a diameter of the ring gear 40. A hydraulic motor 60 is mounted to the extending end 52 of the arm 48 to be drivingly connected with the pinion gear 56, and another hydraulic motor 62 is mounted to the extending end 54 of the arm 50 to be drivingly connected with the pinion gear 58.

Elongated conduits 64,66 are positioned along the irrigation line 12 on opposite sides thereof, and are secured relative thereto by means of a plurality of attaching clips 68 interconnecting the irrigation line 12 and conduits 64,66. The conduits 64,66 also pass through the tube 38 and aperture 44, and the conduit 64 feeds into and communicates with branch conduits 70,72 which in turn communicate with inlets of the hydraulic motors 60,62. The conduit 66 communicates with branch conduits 74,76 which connect with the respective outlets of the hydraulic motors 60,62.

The conduits 64,66 extend from the unit 10 to adjacent an end of the irrigation line 12, to be associated with the structure shown in FIG. 6.

As shown therein, a stationary member 78 has rotatably mounted thereto a rotary member 80, the stationary member 78 defining a passage 82 communicating with a passage 84 in the rotary member 80 by means of an annular channel 86 defined in the stationary member 78. Another passage 88 defined by the stationary member 78 communicates with a passage 90 defined by the rotary member 80 through another annular channel 92 defined by the stationary member 78. The passage 82 communicates with the outlet of a hydraulic pump (not shown), and the passage 88 communicates with the pump reservoir (also not shown). The rotary member 80 is secured relative to the end of the irrigation line 12, the conduit 64 is connected to the rotary member 80 to communicate with the passage 84, and the conduit 66 is connected to the rotary member 80 to communicate with the passage 90.

It will thus be seen that fluid is pumped through the passage 82, channel 86, passage 84, conduit 64, branch conduits 70,72 into the inlets of the hydraulic motors 60,62, and from the outlets of the hydraulic motors through the branch conduits 74,76 and conduit 66, through the passage 90, channel 92 and passage 88 to reservoir, to drive the hydraulic motors to in turn drive the pinion gears 56,58. Through rotation of the pinion gears 56,58, such pinion gears 56,58 move about the outer periphery of the ring gear 40, i.e., such pinion gears 56,58 act as planetary gears which rotate about their respective axes of rotation, and also rotate about the central axis of the ring gear 40. Such rotation of the pinion gears 56,58 about the axis of the ring gear 40 rotates the arms 48,50 to in turn rotate the irrigation line 12. The rotation of such irrigation line 12, as described above, acts to transport the irrigation line 12 over the field. During such movement, it is to be noted that the conduits 64,66 rotate with the irrigation line 12 about the longitudinal axis thereof as the line 12 is moved, with the rotary member 80 of course rotating also.

Irrigation line 12 also has sprockets 94,96 fixed thereto. A chain 102 drivingly interconnects the sprocket 94 and sprocket 98, and a chain 104 drivingly interconnects the sprocket 96 and sprocket 100. As the irrigation line 12 is rotated, the sprockets 94,96 are also rotated, so that rotation of the irrigation line 12 drivingly rotates the wheels 26,28 and the wheels 32,34.

In the actual use of the apparatus, it has been found that the power unit source, including the hydraulic pump, and conduits running therefrom to the mover unit 10 tend to provide a relatively heavy load on one side of the irrigation line 12. Such load, it has been found, tends to act as a drag on that end of the irrigation line 12. To overcome this problem, the mover unit 10 is not placed at the midpoint of the irrigation line, but is placed somewhat closer to the power source than the midpoint thereof of the irrigation line 12. This adds to the load on one side of the irrigation line 12 remote from the power source, and lessens the load on the other side of the irrigation line 12 resulting in the fact that the irrigation line 12 travels evenly and smoothly over the field. In fact, it has been found appropriate to place the mover unit 10 a distance of 45% of the overall length of the irrigation line 12 from the end thereof associated with the power source.

As an alternative, the ring gear 40 could be replaced by a main sprocket, and the gears 56,58 could be replaced by outer sprockets not in engagement with the main sprocket, but spaced therefrom. An endless chain could then be provided, in engagement with one outer sprocket, running along one side of the main sprocket in engagement therewith, about and in engagement with the other outer sprocket, and along and in engagement with the other side of the main sprocket. By providing drive to the outer sprockets, it will be understood that rotation of the irrigation pipe is provided. As yet another alternative, one of the outer sprockets could be deleted, with the chain running from the outer sprocket in engagement therewith substantially completely about the main sprocket and back to the outer sprocket. It should therefore be understood that the terms "ring gear means" and "gear means" as used in the claims of this application are to be interpreted broadly to encompass both the particularly shown and described embodiment, and also the sprockets described above.

What is claimed is:

1. Apparatus for rotating a wheel-supported irrigation line about its longitudinal axis for travel thereof over a field comprising:
   a frame to which the irrigation line is rotatably mounted;
   means for supporting the frame;
   ring gear means fixed relative to the frame;
   arm means fixed relative to the irrigation line and rotatable therewith;
   gear means rotatably mounted relative to the arm means and operatively coupled with the ring gear means; and
   means for driving the gear means rotatably mounted relative to the arm means so that said driven gear means move about the ring gear means to rotate the arm means and irrigation line.

2. The apparatus of claim 1 wherein the means for driving the driven gear means comprise fluid motor means mounted to the arm means and drivingly connected with the driven gear means, and means for driving said fluid motor means comprising conduit means running along the irrigation line and communicating with the fluid motor means.

3. The apparatus of claim 2 wherein said arm means comprise first and second oppositely extending arms, and wherein the driven gear means comprise first and second driven gears in engagement with the ring gear means on opposite sides thereof along a diameter of the ring gear means.

4. The apparatus of claim 3 wherein the means for driving the driven gear means comprise a first fluid motor mounted to the first arm and drivingly connected with the first driven gear, and a second fluid motor mounted to the second arm and drivingly connected with the second driven gear.

5. The apparatus of claim 2 wherein the means for supporting the frame comprise frame wheel means rotatably mounted relative to the frame, and further comprising means interconnecting the irrigation line and frame wheel means for providing that rotation of the irrigation line drivingly rotates the frame wheel means.

6. The apparatus of claim 5 wherein the means interconnecting the irrigation line and frame wheel means comprise chain and sprocket means.

7. The apparatus of claim 4 wherein the means for supporting the frame comprise frame wheel means rotatably mounted relative to the frame, and further comprising means interconnecting the irrigation line and frame wheel means for providing that rotation of the irrigation line drivingly rotates the frame wheel means.

8. The apparatus of claim 7 wherein the means interconnecting the irrigation line and frame wheel means comprise chain and sprocket means.

9. Apparatus for rotating a wheel-supported irrigation line about its longitudinal axis for travel thereof over a field comprising:

a frame to which the irrigation line is rotatably mounted;

frame wheel means rotatably mounted relative to the frame for supporting the frame;

a ring gear fixed relative to the frame;

arm means fixed relative to the irrigation line and rotatable therewith, and comprising first and second arms extending in opposite directions from said irrigation line;

gear means rotatably mounted relative to the arm means, and comprising a first gear rotatably mounted to the first arm adjacent the extending end thereof, and a second gear rotatably mounted to the second arm adjacent the extending end thereof, the first and second gears being in engagement with the ring gear on opposite sides thereof along a diameter of the ring gear; and means for driving the first and second gears so that the first and second gears move on and about the ring gear to rotate the first and second arms and irrigation line.

10. The apparatus of claim 9 wherein the means for driving the first and second gears comprise first and second hydraulic motors mounted to the extending ends of first and second arms respectively and drivingly connected with the first and second gears respectively, and means for driving the first and second hydraulic motors, comprising conduit means running along and secured relative to the irrigation line to rotate therewith, and communicating with the first and second hydraulic motors.

11. The apparatus of claim 10 and further comprising means interconnecting the irrigation line and frame wheel means comprising chain and sprocket means for providing that rotation of the irrigation line drivingly rotates the frame wheel means.

* * * * *

Notice of Adverse Decision in Interference

In Interference No. 99,624 involving Patent No. 3,978,882, G. Cornelius, MOVER UNIT FOR IRRIGATION LINE, final judgment adverse to the patentee was rendered July 17, 1978, as to claims 1–11.

[*Official Gazette October 17, 1978.*]